United States Patent

[11] 3,632,439

[72] Inventor John Deklerk
Pittsburgh, Pa.
[21] Appl. No. 820,702
[22] Filed Apr. 25, 1969
[45] Patented Jan. 4, 1972
[73] Assignee Westinghouse Electric Corporation
Pittsburgh, Pa.
Continuation of application Ser. No. 505,714, Oct. 29, 1965, now abandoned. This application Apr. 25, 1969, Ser. No. 820,702

[54] METHOD OF FORMING THIN INSULATING FILMS PARTICULARLY FOR PIEZOELECTRIC TRANSDUCER
22 Claims, 1 Drawing Fig.

[52] U.S. Cl. .......... 117/215, 117/106, 117/201, 118/49, 118/50, 117/219
[51] Int. Cl. .......... B44d 1/18
[50] Field of Search .......... 117/106, 201, 215, 107, 217, 219; 310/8, 8.2, 9.5; 118/49, 50

[56] References Cited

UNITED STATES PATENTS

| | | | |
|---|---|---|---|
| 2,759,861 | 8/1956 | Collins et al. | 148/175 |
| 2,793,609 | 5/1957 | Shen et al. | 118/49 |
| 2,845,838 | 8/1958 | Lindberg et al. | 117/106 X |
| 2,938,816 | 5/1960 | Gunther | 117/106 X |
| 3,113,040 | 12/1963 | Winston | 117/215 X |
| 3,129,346 | 4/1964 | White | 310/8 |
| 3,033,701 | 5/1962 | Wozniak | 117/47 X |
| 3,325,393 | 6/1967 | Darrow et al. | 117/47 X |
| 3,373,050 | 3/1968 | Paul et al. | 117/106 |

*Primary Examiner*—Alfred L. Leavitt
*Assistant Examiner*—C. K. Weiffenbach
*Attorneys*—F. Shapoe, G. H. Telfer and C. L. Menzemer

ABSTRACT: A film of an insulating compound is formed by evaporating the individual elements from separate sources while maintaining the substrate at a temperature in the range in which neither element will deposit if evaporated alone. A baffle disposed between the sources and the substrate prevents other than vaporized material from reaching the substrate. The film is very pure, may be highly oriented when formed on a suitable substrate, and is particularly useful for its piezoelectric properties.

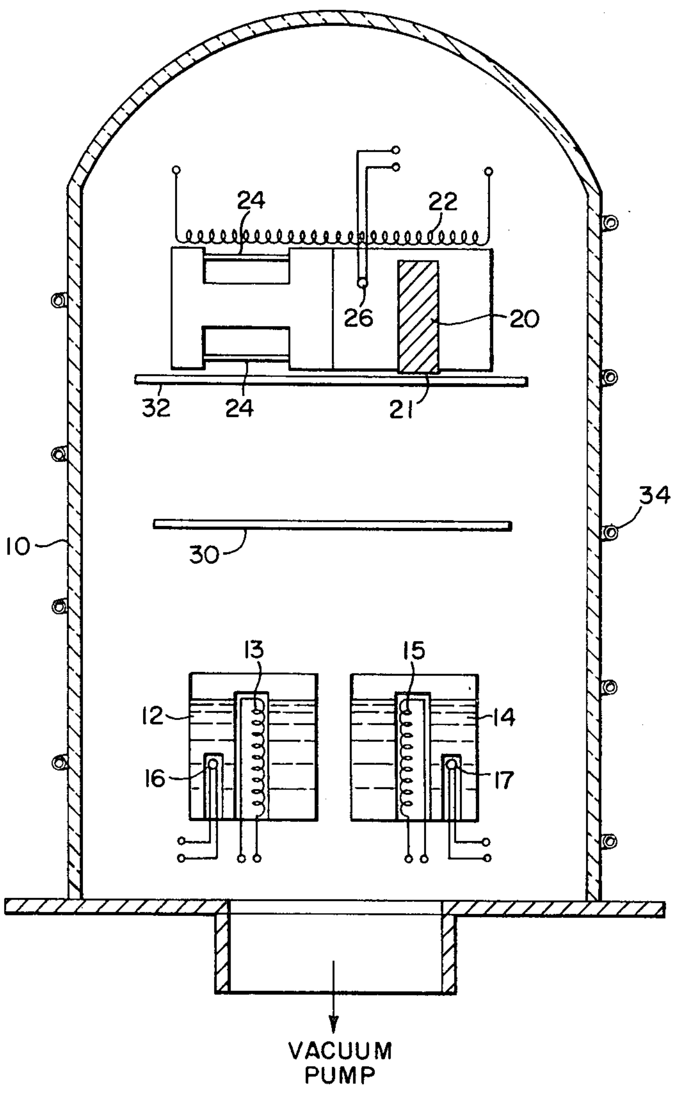
WITNESSES
Edwin E. Bassler
James F. Young
INVENTOR
John de Klerk
BY Gordon H. Telfer
ATTORNEY

METHOD OF FORMING THIN INSULATING FILMS PARTICULARLY FOR PIEZOELECTRIC TRANSDUCER

REFERENCE TO PARENT APPLICATION

This application is a continuation of application Ser. No. 505,714, filed Oct. 29, 1965, now abandoned.

This application relates generally to methods for the formation of thin films of insulating materials particularly for use in piezoelectric transducers and photoconductive devices.

It is of interest to develop means for the production of high-frequency acoustic waves in dielectric materials. Previously hypersonic waves of frequency in the range from $10^8$ to $10^{10}$ cycles per second have been generated in dielectric materials either by direct surface excitation of quartz, using conventional quartz transducers at high harmonics, or by using magnetostrictive films.

The technique of direct surface excitation limits investigations to piezoelectric materials that must have certain specific crystallographic orientations.

Generation by high-harmonic quartz transducers is relatively inefficient and, furthermore, requires the use of acoustic bonds in mounting the transducer that presents additional problems.

The magnetostrictive film technique requires the use of a magnetic field and is thus restricted to purposes not affected by the presence of a magnetic field.

It would be desirable to avoid the problems discussed with the above-mentioned techniques by thin films of piezoelectric material on a suitable substrate. It will be recognized that very high frequency generation requires very thin films because the wavelength is short and half-wavelength films are necessary. It seems that the nature and perfection of the requisite films is very critical for success and it has been difficult to get reproducible results.

For example, a cadmium sulfide is a known material known to exhibit piezoelectric properties. Techniques have also been previously disclosed for forming films of cadmium sulfide by evaporation of the compound from a powdered source. However, it is found that this technique often results in poorly oriented and nonstoichiometric semiconducting films. These films often have such poor electromechanical coupling that they are useless for generating microwave phonons. Useful piezoelectric films must be insulating, not semiconducting, and must be crystallographically highly oriented.

Attempts have been made to change semiconducting films of cadmium sulfide to insulating films by counter doping with copper or silver. These attempts, while effective in increasing the film resistivity, adversely affect its piezoelectric properties and cause the C-axes of the films to rotate approximately 15° to 20° away from the film surface normal. This rotation of the C-axes results in the undesirable simultaneous generation of both shear and compressional waves.

Attempts have also been made to fill sulfur vacancies, which are the cause of the semiconducting properties, by heating the cadmium sulfide film in sulfur vapor at a high temperature. This technique, while also increasing the resistivity somewhat, does not appear to improve the piezoelectric efficiency by any significant amount.

It is considered that all of the prior efforts to form high-frequency piezoelectric transducer films are therefore inadequate because they fail to achieve, reproducibly, a truly insulating crystalline layer with its C-axes normal to the film surface as is desirable for an efficient transducer. The problems in evaporating satisfactory films from a source of the compound may be due to the large difference in the vapor pressures of cadmium and sulfur at any one temperature.

It is, therefore, an object of the present invention to provide an improved method of producing thin films of materials suitable for generating acoustic waves at high frequencies.

Another object is to provide an improved method of forming a thin film of an insulating material which may be precisely doped for controlled semiconductivity.

Another object is to provide an improved method of forming a thin insulating film that requires only a single evaporation step and can be of carefully controlled thickness and does not require treatment after its initial formation.

Another object is to provide an improved method for forming multilayer piezoelectric transducers.

Another object is to provide an improved method for forming thin insulating films of carefully controlled thickness, reproducibly, on a variety of substrate surfaces without requiring the use of bonding materials.

Another object is to provide an improved method of forming high-frequency piezoelectric films that are not affected by shock or magnetic films.

Another object is to provide a method for forming films that are capable of generating either shear waves or compressional waves independently.

The invention, briefly, achieves the above-mentioned and additional objects and advantages by a new vapor deposition technique that utilizes anomalous properties of insulating compounds in that the individual elements thereof have, when evaporated alone, the capability of depositing only on a substrate having a temperature in a limited range. There is typically a gap between suitable substrate deposition temperatures for each of the individual elements of a single compound. But it has been discovered that if the substrate is maintained at a temperature between the temperatures suitable for the single elements, both elements may be simultaneously deposited, from separate sources, forming the compound stoichiometrically.

For example, in the case of cadmium sulfide, it is found that sulfur deposits alone only at substrate temperatures less than 50° C. while cadmium will deposit only at substrate temperatures greater than 200° C. Therefore, at a substrate temperature between 50° and 200° C. neither cadmium nor sulfur will deposit from a vapor of only the individual element. However, if both elements are present successful deposition of cadmium sulfide occurs on the substrate surface.

This technique is also applicable to other insulating materials including, for example III–V and II–VI compounds such as zinc sulfide, indium phosphide, indium arsenide and mercuric sulfide. Also, ternary compounds such as lithium-gallium oxide and antimony sulfur iodide may be formed. These are mentioned merely to demonstrate the versatility of the technique disclosed as applicable to a wide range of types of insulating compounds.

The invention, together with the above-mentioned and additional objects and advantages thereof will be better understood by referring to the following description taken with the accompanying drawing wherein the single FIGURE is a schematic illustration of vapor deposition apparatus used in the practice of the present invention.

The single figure shows the apparatus employed in forming a thin insulating film by the present invention. The apparatus will be particularly described in connection with the formation of films of cadmium sulfide although it will be apparent that other insulating films may be produced by the same method and substantially similar apparatus. Within an enclosure 10, in this instance provided by a bell jar, there are positioned two sources of material to be evaporated, a source of cadmium 12 and a source of sulfur 14. Each of the sources 12 and 14 is a crucible having resistance heating elements 13 and 15, respectively, extending from the bottom thereof. The sources 12 and 14 also have inserted therein thermocouples 16 and 17, respectively, for monitoring the temperature of each source.

Elsewhere within the bell jar there is positioned a substrate 20 having one end 21 exposed so that the vapor of the evaporated elements has access thereto. Films may, if desired, by simultaneously deposited on a plurality of substrates. The substrate 20 is heated by a heater 22 that also heats and maintains at the same temperature a pair of quartz crystal oscillators 24 used to monitor film thickness. A thermocouple element 26 is positioned to monitor the temperature of the substrate and quartz crystal oscillators.

A baffle 30 of a plate of a material such as stainless steel is positioned between the sources 12 and 14 and the substrate 20 to insure the deposition results from the vapor alone and not from direct molecular beams or splashed material. The baffle 30 also prevents infrared radiation from the heated crucibles from reaching the substrate and changing its temperature.

A movable shutter 32 is placed directly below the substrate 20 and the quartz crystals 24. When closed, the shutter 32 completely isolates the substrate and quartz monitor crystal from the vapor. This permits adjustment of vapor emission rates from the crucible to the desired value before deposition is permitted. The shutter also allows the deposition to be abruptly terminated at the desired thickness.

Naturally, suitable means for holding the sources 12 and 14, substrate 20, quartz crystals 24, baffle 30 and shutter 32 are provided but are not illustrated.

A fourth heater element 34 encircles the bell jar and is used to prevent sulfur from immediately depositing on the cold walls. This permits the required sulfur vapor pressure to be maintained and also good visibility into the chamber for visual monitoring.

The four heaters are each controlled separately. The source heaters 13 and 15 are manually controlled to provide the desired vapor emission rates. The heater 34 on the bell jar wall is controlled to a temperature of about 150° C. Cadmium sulfide will be deposited on the bell jar surface and serves as a good visual monitor of the deposition process. The heater 22 for the substrate is maintained at a temperature between 50° and 200° C. because of the fact that within that range stoichiometric cadmium sulfide is produced on the substrate although that is a temperature range in which neither of the individual elements cadmium and sulfur will deposit alone.

The tungsten heater elements 13 and 15 in the sources are shielded from the substrate 20 to prevent contamination of the deposited film. Fused quartz crucibles have been used having a diameter of approximately 2.5 centimeters and a depth of about 5 centimeters.

The insulating films adhere only to a substrate surface that is completely clean. Contamination of the surface also adversely affects the crystalline perfection of the resulting film. A variety of substrates have been satisfactorily employed including aluminum oxide ($Al_2O_3$), magnesium oxide ($MgO$), titanium dioxide ($TiO_2$), fused quartz, crystalline quartz (Z-cut, X-cut, Ac-cut and Y-cut), glass, ruby, germanium, silicon, lithium fluoride ($LiF$), calcium fluoride ($CaF_2$), yttrium aluminum garnet, and gold films supported on $Al_2O_3$. In all instances it is found that the C-axes of the resulting films are perpendicular to the film surface. HOwever, the crystallinity of the film varies depending on the orientation of the substrate. Films deposited on glassy substrates are polycrystalline, with the orientation of the A-axes of the crystallites distributed over angles varying from 15° to 45°. Films deposited on single-crystal substrates (e.g. $Al_2O_3$) have their A-axes much more highly oriented. For epitaxial growth on $Al_2O_3$ it is found preferable for the substrate surface to be perpendicular to the $Al_2O_3$ A-axis.

The following cleaning procedure was generally found adequate and is disclosed by way of example. On any of the mentioned substrates the surface is cleaned by chemical means and then by ion bombardment. It is believed that an ion bombardment step may be essential. Chemical treatment involves first washing in concentrated nitric acid and then in concentrated sodium hydroxide. After being rinsed in distilled water the sample is boiled in ethyl alcohol for about 10 minutes and then held in ethyl alcohol vapor for a few minutes before being blown dry by a jet of dry nitrogen. If the samples are not to be immediately used, they are stored in a vacuum desiccator until the ion bombardment and vapor deposition procedures are to be carried out.

For the ion bombardment cleaning, the ample is placed in a brass or stainless steel holder so that only the one surface to be cleaned is exposed. The sample is then subjected to ion bombardment for at least about 30 minutes using about 700 to 2,000 volts AC at 60 c.p.s. while the pressure in the bell jar is held at approximately 0.1 millimeter of mercury. A minimum current of about 50 milliamperes was found necessary.

After this procedure the bell jar 10 is evacuated to a pressure between $10^{-5}$ and $10^{-6}$ millimeter of mercury before the various heaters are turned on in preparation for vapor deposition. Particular care must be taken in using substrates of hygroscopic materials such as magnesium oxide and the alkaline halides to prevent an amorphous film from forming on the deposition surfaces. These materials should be kept in a vacuum desiccator at all times between surface polishing, surface cleaning and deposition.

The quartz crystal sensing element 24 and the circuitry employed therewith are known and will only be briefly described. Other means for determining the thickness of the evaporated film may be employed. Two quartz-controlled oscillators are used. The crystal of one is exposed to the vapor while that of the other is not and serves as a reference. The outputs of the oscillators are mixed and the difference frequency amplified before being applied to the input of an electronic counter. The difference frequency can be recorded on either a digital printer or a pen recorder or on both if desired. As the cadmium sulfide deposits on the monitor quartz the frequency of resonance changes in direct proportion to the thickness of the films. Of course it is not necessary that the reference quartz oscillator be within the bell jar. It is considered desirable to maintain it at the same temperature as the other oscillator. Film thickness may be precisely determined using an infrared transmission spectrophotometer.

In carrying out the present invention the samples are chemically cleaned, as by the technique mentioned before, before being inserted into the sample holder. The bell jar is evacuated to a pressure suitable for ion bombardment and the sample as well as the microbalance monitor quartz disk is cleaned by ion bombardment. The bell jar is next evacuated to a pressure lower than $10^{-5}$ millimeter of mercury before the bell jar and substrate heaters are turned on. After the temperature of the substrate has reached the desired value the cadmium and sulfur are brought up to their respective boiling points, the heater currents being adjusted so that bubbling just occurs. At this stage the vacuum pumping speed is adjusted to maintain the vapor pressure at the desired value between $10^{-4}$ and $10^{-3}$ millimeter of mercury. This pressure determines the deposition rate which can be adjusted to a suitable value for the film thickness to be deposited. The microbalance and associated circuitry, having been kept operating on standby, are next turned on. When cadmium sulfide deposition on the bell jar 10 is well established to shutter 32 is opened to allow deposition on the monitor quartz 24 and on the substrate 20. From the microbalance calibration curves the required value of the difference frequency is determined for the desired film thickness and the shutter 32 is closed when the electronic counter indicates that this value has been reached. The bell jar and crucible heaters 34, 13 and 15 are then turned off and maximum pumping speed resumed. When the ultimate bell jar pressure is reached, the substrate heater is turned off to allow slow cooling of the substrate and film to room temperature.

The deposition rate is an important parameter affecting the crystal structure of the deposited film. It is found that slower deposition rates result in more highly oriented films. Deposition rates between 5 and 100 angstroms per second have been used.

Highly oriented cadmium sulfide films epitaxially formed on single crystal substrates with oriented A- and C-axes were placed in the electric field of a coaxial cavity and found to generate stress waves which propagate into the substrate material. The orientation of the electric field relative to the film determines the mode of the generated stress waves. When the electric field is normal to the film surface compressional waves alone are generated. When the electric field is in the plane of the film and directed along the A-axis, shear waves alone are generated.

The cadmium sulfide films formed are very pale yellow in color and are of extremely high purity, as indicated by both electrical and electron diffraction studies. Distortion of the lattice due to interstitial or substitutional impurity atoms could not be traced in the electron diffraction measurements. Dark resistivities greater than $10^{12}$ ohm centimeters were measured at room temperature. Active films of cadmium sulfide were made as thick as about 8 microns, with a fundamental resonant frequency near 250 megacycles. Films as thin as 300 angstroms were deposited, with fundamental resonant frequency near 75 gigacycles. No effect due to shock or magnetic fields results with transducers of this type.

Using the vapor deposition technique described, zinc sulfide piezoelectric transducers have also been deposited on aluminum oxide, magnesium oxide and titanium dioxide with success.

It will be recognized that the crystalline insulating materials formed by the method of this invention assume various crystal structures. While a thin insulating film with high crystallinity of cadmium sulfide can be formed by the described technique maintaining the temperature of the substrate between 50° and 200° C. it is found that in the range from 50° to 150° C. the cubic phase of cadmium sulfide is obtained which, while useful for purposes such as photoconductivity, only weakly exhibits piezoelectricity and can only generate shear waves. Between about 150° and 180° C. films having both cubic and hexagonal phases were present. With the substrate at a temperature from 180° to 200° hexagonal cadmium sulfide was deposited having a high degree of piezoelectricity activity.

In the case of zinc sulfide it was found possible to deposit films with a substrate temperature maintained at from 50° to 225° C. with the cubic phase resulting in a range from 50° to 100° C. and the hexagonal phase resulting in a range from 180° to 225° C. Both phases are piezoelectric, the hexagonal phase having a higher electromechanical coupling coefficient. The films of zinc sulfide were colorless and their presence on the substrate can only be verified by observing colored interference fringes in white reflected light.

Results to the present indicate a wide variety of films of insulating compounds can be formed by the method described using separate sources of the individual elements wherein the substrate is maintained at a temperature in the range at which the individual elements do not deposit. II–VI compounds and III–V compounds may be so formed, particularly compounds of the following elements:

| | |
|---|---|
| Group II | Group VI |
| Mg | S |
| Zn | Se |
| Cd | Te |
| Hg | |
| Group III | Group V |
| Al | P |
| Ga | As |
| In | Sb |
| Tl | Bi |

Additionally, other binary compounds such as lead sulfide and ternary compounds such as lithium-gallium oxide and antimony sulfur iodide may be so formed. In forming films of a material such as lithium-gallium oxide, evaporation of lithium and gallium from separate sources is carried out in an oxygen atmosphere, e.g., $O_2$ pressure of about $10^{-4}$ millimeter of mercury and the substrate is maintained at a temperature below those at which deposition of lithium or gallium alone proceeds. In forming films of a material such as antimony sulfur iodide, evaporation of the three elements from separate sources is carried out and the substrate is maintained at a temperature above that at which the deposition of either sulfur and iodine alone occurs and below that at which deposition of antimony alone occurs.

From present information, films of all of the foregoing materials can be formed on substrates maintained between 150° and 200° C. All temperatures expressed herein are approximate.

It is significant that in the practice of the present invention it is not necessary that the source materials be of high purity for production of films which are of extremely high purity. Satisfactory results have been obtained using sources of only about 99.9 percent purity.

Films formed in accordance with this invention may be used with advantage in the fabrication of low-noise microwave delay lines applicable to phased-array radar antennas.

The excellent optical properties of films formed in accordance with the present invention make then quite suitable for infrared detectors or other photoconductive devices. Films of cadmium sulfide are completely transparent to radiation of wavelengths in excess of 15 microns. In general films made by this invention may be used for devices requiring high-impedance photoconductors.

A variation on the specific technique disclosed is to produce a semiconducting film of known and controllable properties by including within the evaporation apparatus a third or possibly a third and fourth crucible for evaporating any desired doping impurities to introduce into the film as formed thus achieving more uniform and controllable doping. Also, by utilizing the photoconductive and semiconductive properties of such films, phototransistors may be fabricated with high sensitivity in the far infrared region.

Besides single-film piezoelectric transducers, the method of the present invention is quite suitable for forming multilayer thin film piezoelectric transducers as described in copending application Ser. No. 505,715, filed Oct. 29, 1965 by P. G. Klemens and assigned to the assignee of the present invention, which application is now abandoned and succeeded by continuation application Ser. No. 871,534, filed Nov. 10, 1969, now issued as U.S. Pat. No. 3,543,058, Nov. 24, 1970. That application should be referred to for further details on such transducers.

The procedure to form a multilayer transducer is to form a first layer of a piezoelectric material having an effective thickness of half the acoustic wavelength which the structure is intended to generate. By effective thickness it is meant that the thickness may be one-half of a single wavelength or an odd integral multiple thereof although a single half-wavelength is preferred. Secondly, a layer is formed of a nonpiezoelectric material also half a wavelength thick and an additional layer of a piezoelectric material also half a wavelength thick is formed. The wavelength is determined by the frequency at which the transducer is to be used and the velocity of sound in the materials of the various layers. One structure for example may be that in which the piezoelectric layers are of cadmium sulfide while the intermediate layer is of silicon dioxide or aluminum oxide. The intermediate layers may be produced by any of the various known techniques. As many active and passive layers as desired may be formed, each extra layer increasing the efficiency. However the increased efficiency is not a linear function of the number of layers and thus from a practical standpoint only a few layers can usefully be used.

The multilayer structure may also be formed so that the layers are alternately hexagonal piezoelectric cadmium sulfide and cubic nonpiezoelectric cadmium sulfide since the latter material is only weakly piezoelectric and only in the shear mode. Such a structure may be fabricated in a single chamber using the sources described above by merely varying the temperature of the substrate so that it is between 180° and 200° C. for forming hexagonal cadmium sulfide layers and is between 50° and 150° C. for forming the intermediate layers of cubic cadmium sulfide. Of course, it is also the case that other insulating or piezoelectric materials may be used in the multilayer transducer structure. The structures have usefulness in forming high-efficiency piezoelectric transducers valuable for use in solid-state microwave delay lines where maximum attainable conversion efficiency is desired.

While the present invention has been shown and described in a few forms only, it will be apparent that various changes and modifications may be made without departing from the spirit and scope thereof.

I claim as my invention:

1. A method of forming a piezoelectric transducer capable of producing acoustic waves of a particular wavelength comprising: forming on a substrate having an oriented surface a first, oriented, layer of a piezoelectric compound selected from the group consisting of II–VI compounds and having an effective thickness that is one-half the wavelength of the desired acoustic waves by evaporating simultaneously from separate sources a quantity of each element of the piezoelectric compound and, during the evaporating step, maintaining the substrate at a temperature that is greater than the maximum temperature at which one element of the piezoelectric compound deposits alone and less than the minimum temperature at which the other element of the piezoelectric compound deposits alone; forming on said first layer a second layer of a nonpiezoelectric insulating material selected from the group consisting of silicon dioxide, aluminum oxide and cubic cadmium sulfide and having an effective thickness of one-half wavelength; forming on said second layer a third layer of a piezoelectric compound as defined for said first layer and having an effective thickness of one-half wavelength by another step of evaporating under the conditions as defined for said first layer, and during said evaporating steps for said first, second and third layers maintaining baffle means between said sources and said substrate to insure only vaporized material reaches said substrate.

2. A method of forming a piezoelectric transducer in accordance with claim 1 wherein: said first and third layers are of zinc sulfide formed while maintaining the temperature of the substrate in the range from 180° to 225° C.

3. A method of forming a piezoelectric transducer in accordance with claim 1 wherein: said first and third layers are of hexagonal piezoelectric cadmium sulfide formed while maintaining the temperature of said substrate in the range from 180° to 200° C.

4. A method of forming a piezoelectric transducer in accordance with claim 3 wherein: said second layer is of cubic nonpiezoelectric cadmium sulfide formed by evaporating simultaneously from separate sources a quantity of cadmium and a quantity of sulfur and, during the evaporating step, maintaining the substrate at a temperature in the range from 50° to 150° C.

5. A method of forming a film of an insulating compound of at least two elements on a substrate surface having a crystalline orientation so that the film has essentially stoichiometric composition and uniform crystalline orientation at least in the direction perpendicular to the surface, wherein said compound is selected from the group consisting of II–VI compounds, III–V compounds, lead sulfide, and antimony sulfur iodide, said method comprising: evaporating simultaneously from separate sources a quantity of each element of the insulating compound to be formed in a space containing said substrate surface while (1) maintaining a baffle means in a position completely blocking the direct path between each of said sources and said substrate surface throughout the formation of said film to insure only vaporized material reaches said substrate surface and to prevent molecular beams, splashed material and infrared radiation from said sources from impinging on said substrate and (2) maintaining the substrate at a temperature that is greater than a maximum temperature at which one element of the insulating compound deposits alone and less than a minimum temperature at which another element of the insulating compound deposits alone, said substrate temperature being such that only said film of said compound deposits thereon.

6. A method of forming a thin film of cadmium sulfide by the steps defined in claim 5 wherein: the substrate temperature is maintained in the range from about 50° C. to about 200° C.

7. A method of forming a thin film of cadmium sulfide by the steps defined in claim 5 wherein: the substrate temperature is maintained in the range from about 180° C. to about 200° C.

8. A method of forming at thin film of zinc sulfide by the steps defined in claim 5 wherein: the substrate temperature is maintained in the range from about 50° C. to about 225° C.

9. A method of forming a thin film of an insulating compound in accordance with claim 5 wherein: prior to said evaporating said exposed surface of said substrate is cleaned including ion bombardment at a current level of at least 50 milliamperes.

10. A method of forming a thin film of an insulating compound in accordance with claim 5 wherein: said substrate is maintained at a temperature of from about 150° C. to about 200° C.

11. A method of forming a thin film of an insulating compound in accordance with claim 5 wherein: the vapor emission rates from said separate sources are controlled to produce film growth on said substrate surface at a rate from 5 to 100 angstroms per second.

12. A method of forming a doped thin film of an insulating compound by the steps defined in claim 5 wherein: simultaneously with the evaporating of the elements of the insulating compound there is evaporated a quantity of doping material.

13. The subject matter of claim 5 wherein: said compound is a III–V compound.

14. The subject matter of claim 5 wherein: said compound is lead sulfide.

15. The subject matter of claim 5 wherein: said substrate is a single crystal and said film deposits with crystalline orientation in directions both perpendicular and transverse to said surface.

16. The subject matter of claim 5 wherein: said compound is a ternary compound and the temperature of said substrate is greater than the maximum temperature at which either of two elements deposits alone and less than the minimum temperature at which the third element deposits alone.

17. The subject matter of claim 16 wherein: said compound is antimony sulfur iodide.

18. The subject matter of claim 5 wherein: said evaporating is performed in an enclosure containing said sources, said substrate, said baffle means and, additionally, a shutter means; positioning said shutter means closely over said substrate surface to prevent deposition thereon for a period until stable vapor emission from said sources occurs; opening said shutter to expose said substrate surface during stable vapor emission; again positioning said shutter means over said substrate to terminate deposition when desired film thickness is obtained.

19. The subject matter of claim 18 wherein: said elements include one that condenses on surfaces at and below normal room temperature; heating said enclosure, during said evaporating, to a temperature above that at which said one element condenses to prevent deposition thereof on surfaces of said enclosure.

20. The subject matter of claim 5 wherein: said compound is a II–VI compound.

21. The subject matter of claim 20 wherein: said compound is cadmium sulfide.

22. The subject matter of claim 20 wherein: said compound is zinc sulfide.

* * * * *